Nov. 9, 1965 A. C. PALATINUS 3,217,256

INDEPENDENT SIDEBAND TRANSMISSION SYSTEM

Filed July 16, 1963 2 Sheets-Sheet 1

INVENTOR.
ANTHONY PALATINUS

BY Ernest J. Weinberger
Max L. Garner
ATTORNEYS

Nov. 9, 1965 A. C. PALATINUS 3,217,256

INDEPENDENT SIDEBAND TRANSMISSION SYSTEM

Filed July 16, 1963 2 Sheets-Sheet 2

INVENTOR.
ANTHONY PALATINUS

BY Ernest J Weinberger
Max R Kraus
ATTORNEYS

United States Patent Office 3,217,256

Patented Nov. 9, 1965

3,217,256
INDEPENDENT SIDEBAND TRANSMISSION SYSTEM

Anthony C. Palatinus, 68—17 60th Road, Maspeth, N.Y.

Filed July 16, 1963, Ser. No. 295,566
8 Claims. (Cl. 325—138)
(Granted under Title 35, U.S. Code (1952), sec. 266)

Figure 1A:
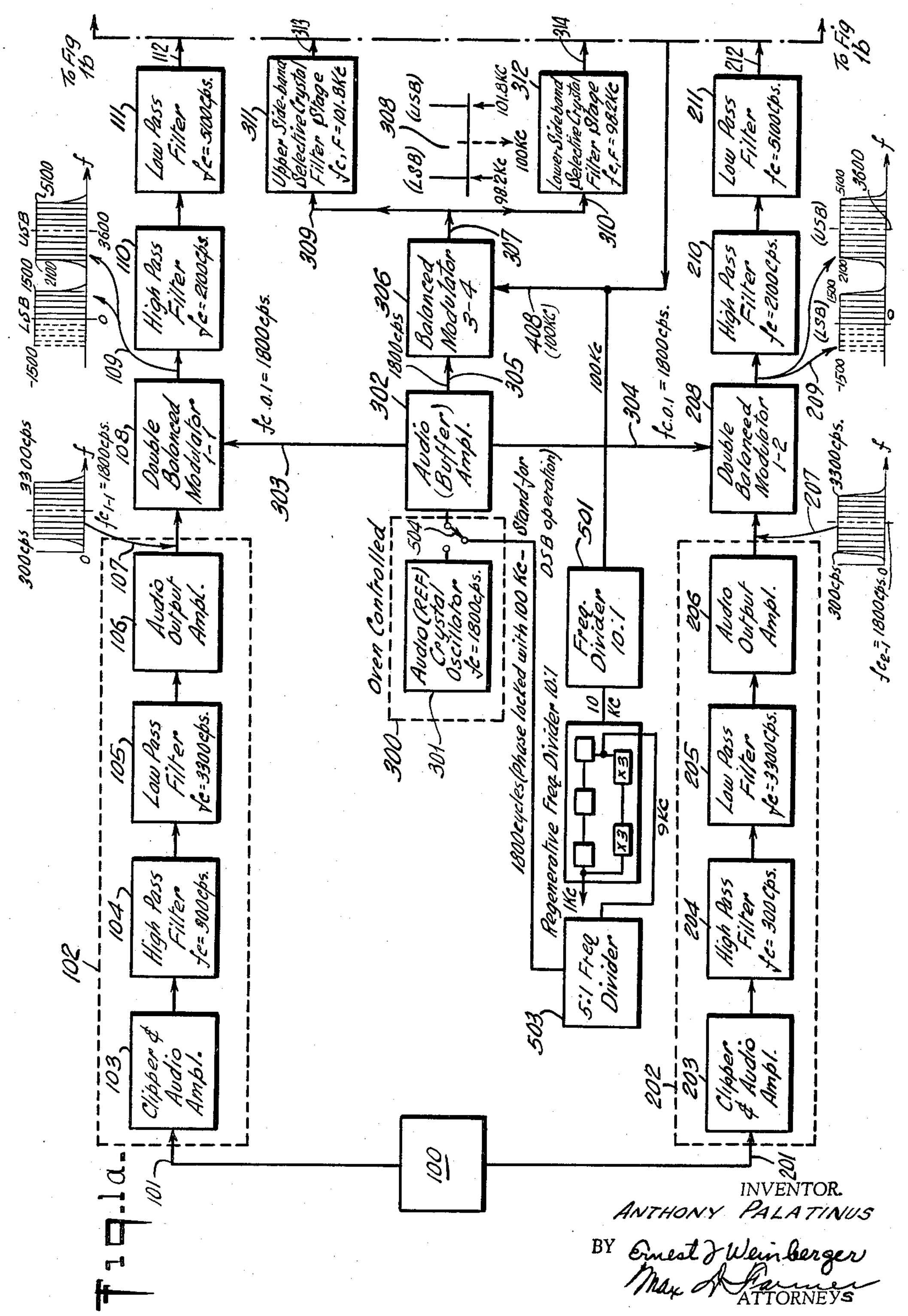
Figure 1B:
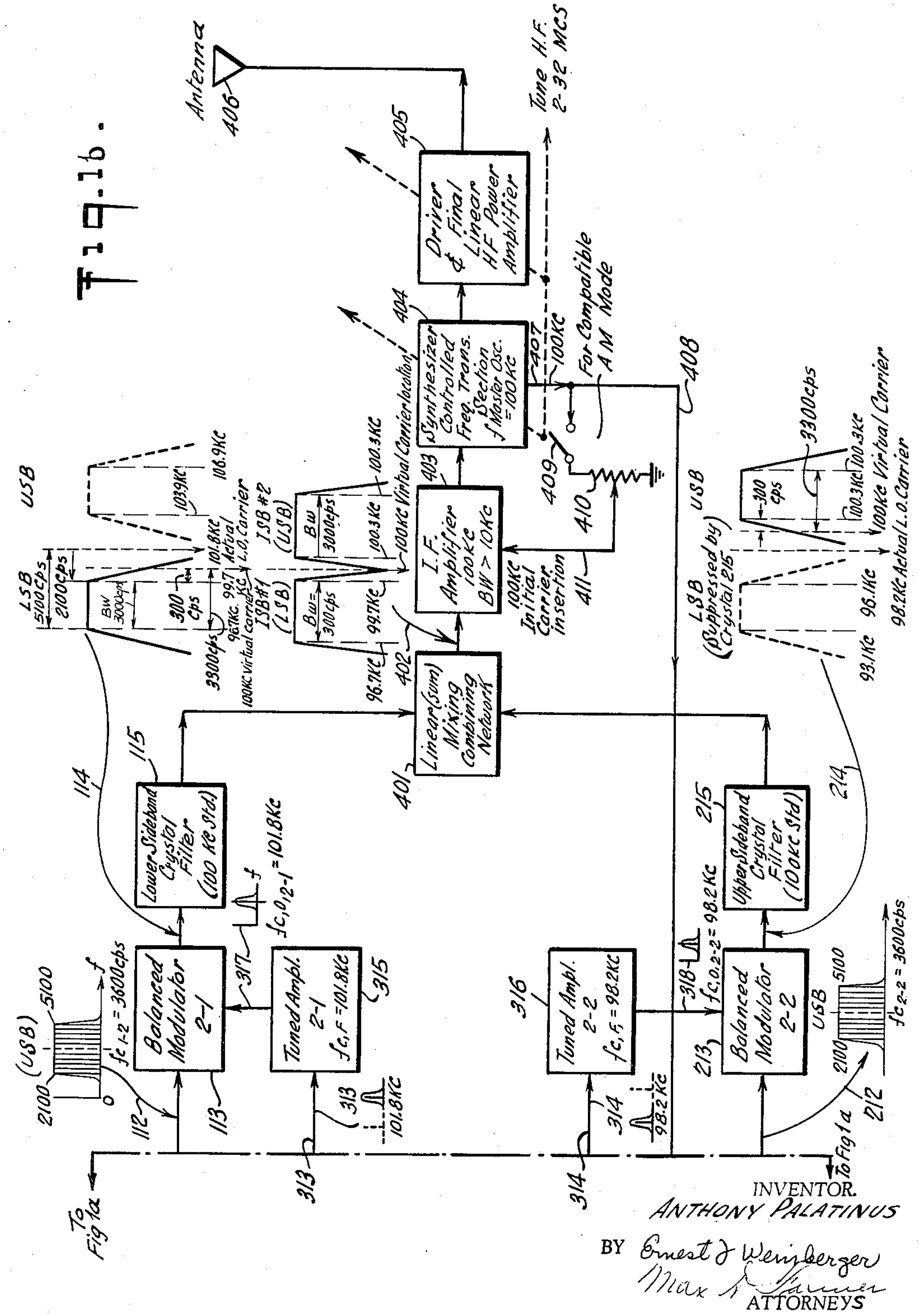

The invention described herein may be manufactured and used by or for the Government of the United States of America for governmental purposes without the payment of any royalties thereon or therefor.

This invention relates to the generation and transmission of single-sideband and in particular to a method and the instrumentation that provides for the transmission of sideband information only, either upper or lower sideband. Further, both sidebands may be transmitted simultaneously with each sideband carrying different modulation information, such system mode of operation being known as independent sideband operation. Independent sideband operation, commonly designated ISB, is a highly desirable and increasingly important mode of operation of communications systems in the high frequency range of 2–30 mcs. The universal need for efficient spectrum administration and optimum bandwidth employment to secure maximum transmission capabilities in this already crowded frequency region of the communication spectrum is well known and presently receiving considerable attention. To achieve both flexibility and full channel capacity in more economical manner, an ISB mode of transmission is desirable and necessary. Separate and distinctly different input modulation sources, such as voice and frequency shift keying or two different voice messages, are applied to separate modulating channel inputs of the SSB transmission system and simultaneously transmitted as the upper and the lower sideband channel of the final carrier frequency at which the transmitter is operating. In such operation, it is important to minimize cross-modulation effects and the undesired sideband channels must be readily suppressed to a negligible level. An equally important requirement is securing the maximum suppression of the carrier frequency itself for ISB operation with allowance for carrier reinsertion when compatible AM operation of the SSB transmission system is desired. Prior methods of achieving sideband suppression rely upon complex phasing techniques or highly selective sideband channel filtering about the carrier frequency. To obtain carrier suppression, present methods rely upon carrier suppression from well adjusted balanced modulator operation combined with sideband channel filtering as mentioned above, and in some transmission systems where further carrier suppression is required, a highly selective "notch" type band stop filter is used in the signal path common to the two sidebands. The requirement of attaining these two necessary SSB transmission characteristics, one being full unwanted sideband suppression and the other being full carrier suppression, are becoming increasingly important in the communications field as highly selective independent sideband type receivers now are going into production. Coupled with these characteristics are the desires for a wide dynamic range of linear operation, a frequency stability of 1 part per $10^8$ or better per day, and many other precision features well known in the SSB art at present. Present methods of suppression cannot and do not afford the necessary suppression without sacrificing other operating characteristics.

It is an object of this invention to provide a method of SSB signal generation and transmission wherein both the sideband and carrier are suppressed to an extent not readily possible in the prior art.

Another object of this invention is to attain greater unwanted sideband suppression by providing much greater sideband channel separation in the modulation process before final sideband channel filtering takes place.

A further object is to provide a relatively simple, direct and inexpensive independent sideband (ISB) operational system with a minimum of cross-modulation.

Still another object of this invention is to establish and provide a new method of communication which functions without the direct introduction of the carrier frequency into the modulation process.

An overall object is to provide a "carrier-less" SSB-ISB transmission system and the attendant benefits derived therefrom with a provision for compatible AM operation by carrier insertion rather than carrier reinsertion as presently practiced.

FIGURES 2*a* and 2*b* are block diagrams of an embodiment employing the principle of this invention wherein an audio or message intelligence network center 100 provides an input to both channels I and II. The center 100 is well known in the art and further provides a switching network for a variety of signals and combinations. The outputs of the center 100 are simultaneously applied to the speech processing portions 102 and 202 of channels I and II.

The speech processing channels serve to limit peak amplitudes and spectrum bandwidth of the voice input to the audio range of interest which, for this illustrative example, is set to be from 300 c.p.s. to 3300 c.p.s. for a channel bandwidth of 3000 c.p.s. However, it is not to be construed that the transmission system itself is band limited for wider bandwidth can be allowed in any specific design application, the particular bandwidth being chosen as a convenient example of various SSB channel bandwidths now in use, such as 300 c.p.s. to 3000 c.p.s. or 2700 c.p.s. BW, 300 c.p.s. to 3500 c.p.s. or 3200 c.p.s. BW, etc.

The speech processing is accomplished in a conventional manner where for channel I (102) and equally well for channel II, the voice modulation input at 101 (201) is applied to clipper and audio amplifier stage 103 (203) input, the output of which is then applied to a band limiting combination of high pass filter 104 (204), being followed in cascade with a low pass filter 105 (205). With the high pass filter network being set for a cut-off frequency $f_c$ of 300 c.p.s. and the low pass filter section cutting off at 3300 c.p.s., resulting in a total bandwidth of 3000 c.p.s. The passband frequency region is flat and unattenuated, with relatively sharp and steep skirts. Audio output amplifier 106 (206) serves to apply this passband of interest (see 107 (207)) to the double balanced modulator 108 (208).

Modulators 108 and 208 are product modulators of the double balanced type. A product modulator serves to produce a resultant output which is proportional to the product of the two input signals applied to it. Comparatively a single balanced arrangement secures effective cancellation or suppression of the local oscillator signal input, which is commonly referred to as the carrier input signal, in the output of the modulator. A double balanced modulator, however, functions to eliminate the appearance of the input (voice) modulating signal in the output of the modulation in addition to the carrier signal being cancelled.

Mathematically, the modulation operation can be described in the following manner and terms.

Let the signal input to say channel I be expressed as a complex waveform consisting of a summation of sinusoidal terms, such that—

$$Ci_1(t)=\sum_{n=1}^{n}E_n\cos\left(W_nt+\phi_n\right)$$

where $E_n$ is the peak amplitude of the $n$th term, $W_n$ is the angular frequency associated with $E_n$, and $\phi_n$ is an arbitrary phase angle associated with $E_n$. It is to be noted that a similar input is applicable simultaneously to channel II input and that the analysis of channel I applies equally to channel II for the first modulation action. The high-pass-low-pass filter cascade combination in the channel speech processing circuits 102 and 202 prior to the double balanced modulators serve to formulate the flat or zero attenuation bandpass region of bandwidth W, where the input audio frequencies are limited to $$f_{low} \leqq f_n \leqq f_{low} + W$$

as they appear at the modulating signal input of the double balanced modulator.

Now consider the application of a carrier input to the modulation of fixed (reference) frequency value and having, for convenience, a unit amplitude. The double balanced modulator is of the product modulator type having its double balanced arrangement set to suppress the appearance of the carrier input in its output, this being the first or single balance; and further suppressing the appearance of the modulating signal input frequencies in its output, this being the second or double balanced condition. It is known that a product modulator secures a resultant output signal that is proportional to the amplitude product of the two input signals, that is, the product of the carrier and the modulating signals. The multiplication process in which two time-functions are multiplied together is expressed in the following manner:

$$Co_{i-1} = Ci_1(t) I \cos W_{c_1} t$$

where I is the peak amplitude of the carrier frequency signal, $W_{c_1}$ is the angular frequency of the carrier wave and $Co_{i-1}$ is the time relationship of the modulator's output wave. By substitution, $$Co_{i-1} = \sum_{n=1}^{n} E_n \cos (Wnt + \phi_n) \cos W_{c_1} t$$

which by trigonometric expansion becomes $$Co_{i-1} = \frac{1}{2} \sum_{n=1}^{n} \{E_n \cos [(W_n - W_{c_1}) t + \phi_n] + E_n \cos [W_n + W_{c_1}) t + \phi_n]\}$$

Hence the double sideband output of a product modulator consists of difference frequency product terms of $(W_n - W_{c_1})$ and sum frequency product terms of $(W_n - W_{c_1})$. Now let the carrier frequency $f_{c_1}$ be chosen as equal to the sum of the lowest input modulating frequency $f_{n_{low}}$ plus the frequency amount that is equal to one-half the bandwidth W to which modulation frequency $W_n$ are limited. Thus, $$f_{c_1} = f_{n_{low}} + \tfrac{1}{2} W_1$$

which also represents the center frequency value of the bandpass region that is allowed to the modulating spectrum input, and may be expressed as:

$$f_{c_1} = \tfrac{1}{2} (f_{n_{low}} + f_{n_{high}})$$

In effect, the carrier frequency is positioned at the center of the band limited voice spectrum. Here this technique serves to locate the difference frequency components about the zero frequency axis or D.C. term, with the highest physically realizable frequency (negative frequencies being non-existent), being at a value equal to one-half of the bandwidth of the input channel (½W).

In balanced modulator operation, the sum terms can be referenced as the upper sideband content and the difference terms as the lower sideband content, with the minimum frequency separation between the two sidebands being equal to twice the lower input modulating frequency or $2 \times f_{low}$. Here high pass-low-pass cascade filters are used to select the upper (sum terms) sideband and attenuate the lower (difference terms) sideband. The cut-off frequency of the high-pass filter is set at $$f_{c.o._{HP}} = (\tfrac{1}{2} W + 2 f_{low})$$

which is the lowest frequency value existing in the upper sideband output. The cut-off frequency for the low pass section then becomes $$f_{c101LP} = W + f_{c.o._{HP}} = (\tfrac{3}{2} W + 2 f_{low})$$

A new band of modulating frequencies is thereby provided which exists between the limits of $$(\tfrac{1}{2} W + 2 f_{low}) \leqq f_{new} \leqq (\tfrac{3}{2} W + 2 f_{low})$$

The modulating input signal bandwith as shown in 107 (or 108) is confined by the band filtering between the limits of lower frequency value 300 c.p.s. ($f_{low}$) and upper frequency value 3300 c.p.s. ($f_{high}$), for a total spectrum bandwidth of 3000 c.p.s. The center frequency location of this spectrum portion of interest thus locates itself at $$f_{cBW} = f_{low} + \tfrac{1}{2} BW = 300 \text{ c.p.s.} + \tfrac{1}{2} (3000 \text{ c.p.s.})$$

or at 1800 c.p.s. This value then determines the carrier signal frequency value that is to be applied to the double balanced modulators 108 and 208. The generation of this 1800 c.p.s. carrier signal will be described hereinafter, it being sufficient for present purposes to state that it is exceedingly stable frequency, of high accuracy, with the proper carrier signal level being applied.

The modulator delivers a double sideband output structure such as shown 109 (209). The lower sidebands' content, which constitute the difference frequency product terms, centers itself about the zero frequency axis (i.e., D.C.) such that it has frequency limits of ±1500 c.p.s. for its 3000 c.p.s. bandwidth. The negative frequency values are not of physical interest and only the portion from 0 to 1500 c.p.s. is actually realizable. The upper sideband of the double sideband output has its frequency component content consisting of sum frequency product terms, and accordingly centers itself about the sum term of the input band center frequency value and the carrier frequency value to the modulator which has been set to be equal, thus giving a spectrum band center in the output of 1800 c.p.s. and 1800 c.p.s.=3600 c.p.s. Here the frequency limits for the 3000 c.p.s. bandwidth becomes 3600 c.p.s.±1500 c.p.s. or 3600−1500=2100 c.p.s. as the lower frequency limit and 3600+1500=5100 c.p.s. for the upper frequency limit. The minimum frequency separation between the two sideband structures of the double sideband output of the modulator is limited to twice the lowest modulating frequency of the input (voice) modulating signal, which for the given example is 2×300=600 c.p.s. The output of the double balanced modulator is first applied to a high-pass filter 110 (210) which serves to heavily attenuate all frequency components below its cut-off frequency value of 2100 c.p.s., this stage is followed by low-pass filter 111 (211) having its cut-off frequency located at 5100 c.p.s. Thus the high pass filter serves to produce the initial sideband suppression at the lowest audio frequency value allowed, namely, the one-half spectrum band at the zero frequency axis (negative frequencies not physically in existence) being radially attenuated. The low-pass filter cutting off at 5100 c.p.s. serves to band limit this passed channel to its 3 kc. bandwidth. In conjunction these filters form a pass-band or band limiting filter. No signal energy exists between the sideband limits of 1500 c.p.s. and 2100 c.p.s. and the high attenuation rate of the high pass filter from 2100 c.p.s. to lower frequencies adequately attenuates the lower sideband so that the resultant energy only exists from 2100–5100 c.p.s. as indicated.

Now the selected spectrum band output of the band-pass combination of 110 and 111 (or 210 and 211) is between the frequency limits of 2100 c.p.s. and 5100 c.p.s. with the 3000 c.p.s. channel bandwidth being maintained and the lower side band output of the double balanced modulated greatly attenuated. At this point, the passed sidebank structure being as shown by 112 (or 212) has a new spectrum band center frequency value of $$f_{cb_{new}}=f_{low_{Upper}}+\tfrac{1}{2}BW=2100\text{ c.p.s.}+1500\text{ c.p.s.}$$

or 3600 c.p.s. This new spectrum band of interest now becomes the modulating signal input to the single balanced modulator 113 (213 for channel II). At this point in the signal processing path, only a balanced modulator arrangement that secures cancellation of the carrier (or local oscillator) signal input is required. The appearance of the modulating signal input in the modulator output being fully eliminated by the sideband filtering action that takes place in this modulator's output. The balanced modulators 113 and 213 are of similar type and from this stage forward, the two channels which had been similar, differ in that opposite sideband selection are made. In the illustrated example, channel I is made to locate itself in the lower sideband output (LSB) of the transmission system while channel II is set to use the upper sideband channel output (USB) of the transmitter with reference to the transmitter's operating carrier frequency to which it is to be tuned. Alternate possibilities are available with this method of transmission as will be readily evident by those skilled in the art after explanation of the principle, construction and operation of this invention.

Consider first the operation that concerns development of the lower sideband of the system for channel I. The modulating input signal that is applied to balanced modulator 113 is as shown in sketch 112. The local oscillator signal, 317 which is the carrier input to the balanced modulator and the signal to which the modulator is balanced in order to attain proper suppression is derived from a highly stable source to be described hereinafter. The frequency value of this carrier signal 317 is selected to lie above the carrier frequency value of the modulator section prior to subsequent frequency translation to the final specific carrier frequency value of the transmission system in the range of say 2–32 mc. Let 100K c.p.s. be used in the given example as the carrier frequency value of the modulator section output, then frequency values up to say 2 mcs. can well be used. Selection of the 100 kc. value allows use of well-known crystal frequency synthesizer having a standard master oscillator source of 100 kc. of the highest stability and performance. Likewise 100 kc. crystal sideband filters of excellent capability are readily available and of direct usage for this type system. The carrier signal 317 frequency is equal to the sum of the reference carrier frequency value of the modulator section and the center frequency value of the input modulating spectrum band to the modulator section, or 100 kc. plus 1800 c.p.s. which is equal to 101.8 kc.

Consider now the double sideband output of the balanced modulator 113 resulting from the product of its two input signals, the modulating input signal band of 2100 c.p.s. to 5100 c.p.s., centered about 3600 c.p.s. and the carried local (101.8 kc.) oscillator signal 317 In accordance with conventional operation, the double sideband output has its sideband content located in a symmetrical manner about the actual carrier frequency value of 101.8 kc. being applied to the modulator. The sideband distribution as shown at 114 locates itself about the actual carrier local oscillator signal frequency value of 101.8 kc. such that the lower sideband content covers a region from 2100 c.p.s. to 5100 c.p.s. below 101.8 kc. or between the actual frequency values of 99.7 kc. and 96.7 kc. for the 3000 c.p.s. bandwidth of channel I. Similarly, the upper sideband channel locates itself from 2100 c.p.s. to 5100 c.p.s. above the actual carrier frequency or from 103.9 to 106.9 kc. covering the 3 kc. bandwidth. Now again, it is to be noted that the minimum frequency separation between the sideband channels in the double sideband output of a balanced modulator is equal to twice the lowest modulating frequency value, where in the given example, this separation becomes 2×2100 c.p.s. or 4200 c.p.s. Now it can be readily seen that the sideband channel separation of the double sideband output of the double balanced modulator 108 of 600 c.p.s. has now been advantageously increased to 4200 c.p.s. in the output of modulator 113. Of these relatively widely spaced sideband channels, the lower sideband channel is to be accordingly selected as the transmission channel path for channel I. It is at this point that the full dynamic features of the novel carrier offset operation of the balanced modulator becomes obvious and exceedingly fruitful. It is to be recalled that the carrier reference frequency value of the modulator section was set to be 100 kc. This 100 kc. value is shown at 114 and can be here referenced as the virtual or hypothetical carrier frequency. The required lower sideband selection is now achieved by applying the output of balanced modulator 113 to lower sideband crystal filter 115 which is a standard 100 kc. asymmetrical sideband filter structure designed to suppress a 100 kc. carrier frequency and the sideband above 100 kc. and still readily pass frequencies 300 c.p.s. to 3300 c.p.s. below the 100 kc. value. Looking again to the modulator output of 114, it is to be noted that the existing lower sideband structure begins 2100 c.p.s. below the actual carrier frequency of 101.8 kc. which is at 99.7 kc. or 300 c.p.s. belowe the virtual or hypothetical carrier frequency value of 100 kc. Similarly at the other limit of the 300 c.p.s. bandwidth, 5100 c.p.s. below 101.8 kc. or 96.7 kc. is thereby located 3300 c.p.s. below the virtual carrier of 100 kc. The standard 100 kc. lower sideband crystal filter 115 normally set to produce 100 kc. carrier suppression also results in the suppression of the sideband component 300 c.p.s. above 100 kc. The asymmetrical selectivity characteristic of the filter with its sharp skirt attenuation from 300 c.ps. below carrier to higher frequencies attains unsurpassed actual offset carrier and undesired sideband suppression. This 100 kc. sideband filter does not function to suppress the 100 kc. carrier frequency value of the modulator section, since this frequency component is not directly used in the modulation process. Since standard sideband crystal filters for 100 kc. have a steep side attenuation characteristic of 0.5 to 60 db from 300 c.p.s. away to the virtual carrier frequency of 100 kc., the actual carrier and unwanted sideband is further attenuated even allowing for the bounce back effects, that is, the decrease of out of band attenuation at frequencies further removed from the passband region, which is common with steep sided filters.

Thus the channel output of 100 kc. sideband filter 115, which is the bandpass region between 99.7 kc. and 96.7 kc. is then applied to the conventional linear summation mixing stage 401 for subsequent linear amplification frequency translation, power amplification and transmission in the 2–32 mcs. range, as the lower sideband of the transmitter operating carrier frequency value. In the illustrated example, the upper sideband channel of the system and the single balanced modulator 213 in the signal path of channel II has an actual carrier frequency value applied to it that is oppositely offset from 100 kc. by the same audio frequency amount as is being applied to modulator 113 of channel I. Whereas for channel I the actual carrier frequency used is above the reference carrier by 1800 c.p.s., for modulator 213 of channel II the actual carrier frequency 318 is 1800 c.p.s. below the reference carrier value of 100 kc. or 100 kc.—1.8 kc.=98.2 kc. The actual carrier frequency values of 101.8 kc. (317) and 98.2 kc. (318) are of equal stability and accuracy and their generation is described hereinafter.

The duoble sideband output of modulator 213 as shown at 214 is applied to a standard 100 kc. sideband crystal filter 215 that is designed to pass the upper sideband content of the double sideband output. In this case, the upper sideband channel bandwidth between 100.3 kc.

and 103.3 kc. is passed without attenuation, while the relativley remotely located lower sideband content between 93.1 kc. and 96.1 kc. and the already suppressed actual carrier frequency signal at 98.2 kc. are heavily attenuated and quite readily suppressed from appearing in the output of filter 215. Again the relatively widely spaced sideband location of the double sideband output of modulator 213 functions to optimize unwanted sideband suppression and further suppression of the already suppressed actual carrier frequency (98.2 kc.) signal. The passband output of filter 215, that is, the 3 kc. bandwidth between 100.3 kc. and 103.3 kc. is linearly combined with the lower sideband of channel I in the linear sum mixer 401. The resultant output of stage 401 is as shown at 402, where the 2SB (BW of 3 kc.) for channel I and the USB (BW of 3 kc.) for channel II locate themselves symmetrically about the virtual or hypothetical carrier reference frequency value of the modulator section with the LSB channel appearing inverted as is conventional and well known. Here again it is to be noted that the virtual carrier reference (100 kc.) does not imply a suppressed carrier level but a hypothetical, non-existent reference component wherein there is no carrier suppression technique such as "notch" filters. The omission of the actual 100 kc. carrier usage in a direct manner is further exemplified when in the following 100 kc. IF amplifier stages 403, initial 100 kc. carrier insertion is first made for compatible AM operation of this novel transmission system rather than what is universally referred to carrier reinsertion. Within this context it can be seen that reinsertion is not being made since the actual carrier frequency value of 100 kc. does not directly exist within the modulation process path. The method of carrier insertion is quite conventional and simliar to the present technique of carrier reinsertion. The 100 kc. carrier injection signal is supplied from the ultra-stable (1 part per $10^8$ per day) 100 kc. master oscillator frequency standard of the transmission systems frequency synthesizer 404. Besides being internally supplied in the conventional and well-known manner of synthesis operation for the generaiton of the range of selectable equally stable frequencies required in the frequency translation process accomplished by section 404, the 100 kc. standard frequency signal output 407 is also applied over two other paths, 409 and 408.

The 100 kc. IF amplifier stages 403, the synthesizer controlled frequency translation section 404, the intermediate power amplifier and final linear power amplifier and antenna coupling stages 405 and associated antenna 406, are all common to the two sideband signals with bandpass regions greater than 100 kc., complete the transmission path of the transmitter system.

These stages and sections are well known in the art and their application in the manner shown in conventional and of standard practise in covering the transmission range of 2–32 mcs.

The system thus described achieves the SSB transmission standards for spectrum conservation and full channel utilization with the allotted sideband channel spacing of 600 c.p.s., that is, 300 c.p.s. above and below the final transmitter carrier frequency, for proper independent sideband channel transmission of upper and lower 3 kc. bandwith channels of differentiating signal information content in a simultaneous manner. When conventional compatible AM mode of operation is desired, only one independent sideband channel is activated by the audio control center 100, and a desired portion of the 100 kc. signal from 407 is injected into the 100 kc. IF amplifier stages 403 to allow for the transmission of the single sideband and the carrier while subsequent AM detection is effected at the communication systems receiving station. The necessary carrier level amplitude is adjusted shown by potentiometer 410 after the closure of switch 409. For independent sideband operation switch 409 remains open. While not shown in the simplified block diagram arrangement, adequate isolation is conventionally provided between the two separate signal paths of the 100 kc. standard frequency signal output at 407.

The other separate path of the 100 kc. standard frequency signal leads by way of 408 to carrier input of single balanced modulator 306. It is noted from the operation description given in the earlier paragraphs, that three actual carrier signal frequency values are generated and applied in the sideband modulation process of the modulator section. For the similar double balanced modulators 108 and 208 of channels I and II, respectively, an ultra-stable and accurate carrier frequency of 1800 c.p.s. is required. For the single balanced modulators 113 and 213 of channel I and channel II respectively, ultra-stable and accurate carrier frequencies of 101.8 kc. and 98.2 kc. are respectively required.

Now the 1800 c.p.s. carrier signal is directly derived from audio reference oscillator 301 which, for upmost stability over wide ambient temperature variation for the system, may be temperature-controlled or compensated as by enclosure with a conventional oven 300. This audio reference oscillator 301 may well be of the crystal controlled type or of the tuning fork resonator type depending upon the specific system stability requirements. The 1800 c.p.s. oscillator signal is applied to tuned audio amplifier stages 302, which also serves as a buffer, amplifies the carrier signal up to the proper level for application to the double balanced modulators 108 and 208 over paths 303 and 304, respectively to serve as the required carrier frequency input to these modulators. A portion of amplifier 302 output is also applied to single balanced modulator 306 via signal path 305 as an input modulating signal. A second input to this modulator 306 is a carrier frequency input of 100 kc. supplied over path 408 from the synthesizer 404. The balanced modulator 306 output at 307 is as shown at 308 and consists of the suppressed carrier signal of 100 kc. and the sum and difference frequency products of the 1800 cycle input and 100 kc. carrier signal. Thus upper and lower sideband frequency components are developed where the upper sideband term is 100 kc.+1.8 kc.=101.8 kc. and the lower sideband term 100 kc.−1.8 kc.=98.2 kc. This double sideband output at 307 is simultaneously applied to circuit two paths 309 and 310. Signal path 309 leads to selective bandpass crystal filter 311 which has a center frequency value equal to the USB component frequency value of 101.8 kc. while signal path 310 leads to selective bandpass crystal filter 312 which has a center frequency value equal to the LSB component frequency value of 98.2 kc.

It is to be noted, as common with balanced modulator operations, that the sideband components are separate by twice the modulating frequency or 2×1800 c.p.s.=3600 c.p.s. and are separated from the actual suppressed carrier frequency by the modulating frequency or 1800 c.p.s. This 100 kc. carrier reference is the virtual or hypothetical carrier frequency value of the modulator section and is here indirectly used in the modulation process to achieve the ultimate in overall frequency stability of the entire transmission system in keeping with the stringent requirements of present and future single side band communication systems.

The 100 kc. carrier signal suppressed by the action of modulator 306 and further reduced or eliminated in the direct modulation process by the selectivity characteristics of the narrow-band-pass crystal filters 311 and 312 along with the respective undesired sideband component being applied.

Hence the output of filter 311 is the upper sideband component of 101.8 kc. (see 313), while the output of filter 312 is essentially the lower sideband component of 98.2 kc. (see 314). These signals are then applied to tuned local oscillator amplifiers 315 and 316, respectively, which are tuned to the frequency inputs of 101.8 kc. and 98.2 kc. respectively. These amplifiers are set to apply the proper carrier signal levels to the balanced modulators.

The specific circuits configuration as represented by the designated blocks and their operation is well known to those experienced in the electronics art. In effect, this system requires no specifically uniquely developed circuitry other than quality design of the designated block configurations in accordance with specific system design requirements and good standard practise and construction. For example, modulators 108 and 208 may be well known double balanced ring modulator circuit arrangement whose output consists entirely of product term. Hall effect product modulators serve equally well for such an application. A typical audio reference oscillator 301 of the crystal controlled, oven stabilized type makes use of the AT cut quartz crystal unit, and are presently available on the market.

The high-pass filters 110 and 210, set to cut-off at 2100 c.p.s. can be passive or of the active R.C. filter type and in this particular case there are known configurations which produce attenuation rates of 60 db per octave or even greater when employed in multiple sections or stages. Another well-known circuit configuration that would generally apply for bandpass selective crystal filter stages 311 and 312 are active single series resonant crystal filter stages terminated in a tuned load to achieve the desired bandwidth. Conventional passive symmetrical narrow passband crystal filter units of say 70 c.p.s. bandwith and 1:5 shape factor can also be satisfactorily used.

In the description of this invention, as given above, a separately stabilized local oscillator 301 is used to generate the 1800 c.p.s. carrier frequency signal for application to the first modulation processes in order to simplify the explanation. It is readily obvious that the required signal frequency value of 1800 c.p.s. can also be derived and continuously supplied from the frequency synthesizer proper, through established phase lock techniques. For example, the reference 100 kc. standard frequency can be divided down 10:1 to 10 kc. by divider 501 and then the 10 kc. signal divided down 10:1 to 1 kc. using regenerative frequency divider 502. The 9 kc. signal internally generated within the regenerative feedback loop of frequency divider 502 is fed by separate path to a 5:1 divider 503 for the 1800 c.p.s. carrier signal, and by way of switch 504 applied to amplifier 302 to the balanced modulators.

Two outstanding facts are readily evident from the foregoing description. First double balanced modulators are employed since they may be set to cancel out the 1800 cycle carrier frequency which exists at the input in conjunction with the use of split filters (110, 111, and 210, 211) deleting the ordinary sideband filters. Secondly, there is in effect no carrier frequency existent at the linear mixing network since by using low frequency or audio filtering it is possible to separate the two sidebands whereas if attempted at some higher frequency this would be virtually impossible.

It will be understood that various changes in the details, materials and arrangements of parts (and steps), which have been herein described and illustrated in order to explain the nature of the invention, may be made by those skilled in the art within the principle and scope of the invention as expressed in the apended claims.

I claim:

1. A communication transmission system for the simultaneous transmission of two independent sidebands of a common carrier which comprises:

(a) a pair of identical channels each having connected in series therein:
 (1) means for limiting the amplitude and frequency bandwidth of an input signal,
 (2) a double balanced modulator,
 (3) an upper passband filter,
 (4) a balanced modulator, (b) a source of audio frequency oscillations connected to both of said double balanced modulators for producing therefrom a lower and upper sideband signal devoid of said audio frequency, (c) a first source of oscillation of a frequency above the audio spectrum connected to one of said balanced modulators for producing therefrom a lower and upper sideband output, (d) means connected to said one of said balanced modulators for filtering and removing from the output thereof said upper sideband, (e) a second source of oscillations of a frequency above the audio spectrum differing in frequency from said first source and connected to the other of said balanced modulators for producing therefrom a lower and upper sideband output, (f) means connected to said other balanced modulator for filtering and removing from the output thereof said lower sideband, (g) linear summing means connected to receive the outputs of both said means for filtering for combining the same, (h) transmission means connected to said summing means to radiate the output thereof in the form of electromagnetic energy, (i) whereby when two distinct and separate intelligence signals are applied to said means for limiting said intelligence signals will be radiated as two independent sidebands.

2. The communication transmission system according to claim 1, wherein the difference in frequency between said first and second source is equal to twice the frequency of said audio oscillations.

3. The communication system according to claim 2, wherein said audio oscillations are phase locked with the oscillations of said first and second sources.

4. The communication system according to claim 3, wherein said means for limiting includes:

(a) an amplitude limiting clipper, (b) an audio passband filter, (c) an audio amplifier.

5. A communication transmission system for the simultaneous transmission of two independent sidebands of a common carrier which comprises:

(a) a pair of identical channels each having connected in series therein:
 (1) means for limiting the amplitude and frequency bandwidth of an input signal,
 (2) a double balanced modulator,
 (3) an upper passband filter,
 (4) a first balanced modulator, (b) a source of ultra-stable oscillations of a frequency above the audio spectrum, (c) a frequency divider connected to said source to produce an output frequency in the audio spectrum, (d) a second balanced modulator having connected thereto said divider and said source for producing an output having therein the sum and difference frequencies, (e) a lower frequency filter disposed between the output of said second balanced modulator and the input of one of said first balanced modulator to pass only the sum frequency, (f) a higher frequency filter disposed between the output of said second balanced modulator and the input of the other of said first balanced modulators to pass only the difference frequency, (g) means connecting the output of said divider with both of said double balanced modulators, (h) means connected to said one of said balanced modulators for filtering and removing from the output thereof said upper sideband, (i) means connected to said other balanced modulator for filtering and removing from the output thereof said lower sideband, (j) linear summing means connected to receive the outputs of both said means for filtering for combining the same, (k) transmission means connected to said summing means to radiate the output thereof in the form of electromagnetic energy, whereby when two distinct and separate intelligence signals are applied to said means for limiting said intelligence signals will be radiated as two independent sidebands.

6. The communication system according to claim 5, further including switch means for selectively injecting said ultra-stable oscillations in to said transmission means whereby said system will be amplitude modulated.

7. The communication system according to claim 6, wherein said lower and higher frequency filters are crystal filters.

8. The communication system according to claim 7, wherein said double balanced modulators are tuned to said output frequency in the audio spectrum.

No references cited.

DAVID G. REDINBAUGH, *Primary Examiner.*

REEXAMINATION CERTIFICATE (451st)

United States Patent [19]

Palatinus

[11] B1 3,217,256

[45] Certificate Issued Feb. 11, 1986

[54] INDEPENDENT SIDEBAND TRANSMISSION SYSTEM

[76] Inventor: Anthony C. Palatinus, 68-17, 60th Rd., Maspeth, N.Y.

Reexamination Request:
No. 90/000,675, Nov. 30, 1984

Reexamination Certificate for:
Patent No.: 3,217,256
Issued: Nov. 9, 1965
Appl. No.: 295,566
Filed: Jul. 16, 1963

[51] Int. Cl.[4] .............................................. H04B 1/68
[52] U.S. Cl. .................................. 455/109; 455/112; 455/126; 332/44; 381/16
[58] Field of Search .................. 455/108, 109, 46, 47, 455/116, 126; 332/44, 45; 381/16

[56] References Cited

U.S. PATENT DOCUMENTS 2,270,385 1/1942 Skillman .
2,284,706 6/1942 Wiessner et al. .
2,775,646 12/1956 Grosjean .
2,928,055 3/1960 Weaver .

OTHER PUBLICATIONS

"Modulators and Frequency Changers for Amplitude Modulated Line and Radio Systems", by D. G. Tucker (MacDonald & Co., 1953).

*Primary Examiner*—Jin F. Ng
*Attorney, Agent, or Firm*—James P. Malone

EXEMPLARY CLAIM

1. A communication transmission system for the simultaneous transmission of two independent sidebands of a common carrier which comprises:

(a) a pair of identical channels each having connected in series therein:
  (1) means for limiting the amplitude and frequency bandwidth of an input signal,
  (2) a double balanced modulator,
  (3) an upper passband filter,
  (4) a balanced modulator, (b) a source of audio frequency oscillations connected to both of said double balanced modulators for producing therefrom a lower and upper sideband signal devoid of said audio frequency, (c) a first source of oscillation of a frequency above the audio spectrum connected to one of said balanced modulators for producing therefrom a lower and upper sideband output, (d) means connected to said one of said balanced modulators for filtering and removing from the output thereof said upper sideband, (e) a second source of oscillations of a frequency above the audio spectrum differing in frequency from said first source and connected to the other of said balanced modulators for producing therefrom a lower and upper sideband output, (f) means connected to said other balanced modulator for filtering and removing from the output thereof said lower sideband, (g) linear summing means connected to receive the outputs of both said means for filtering for combining the same, (h) transmission means connected to said summing means to radiate the output thereof in the form of electromagnetic energy, (i) whereby when two distinct and separate intelligence signals are applied to said means for limiting said intelligence signals will be radiated as two independent sidebands.

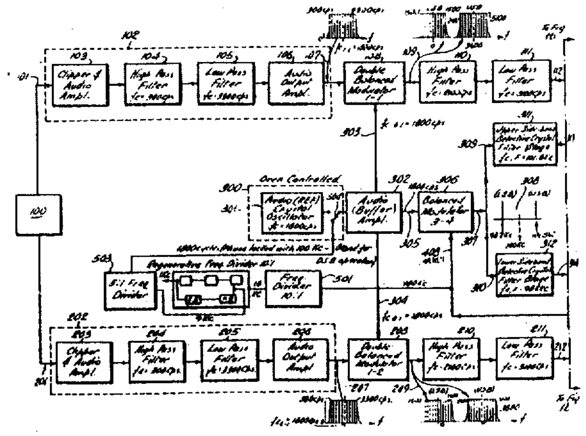

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5–8 is confirmed.

Claims 1–4 are cancelled.

* * * * *